(12) United States Patent
Furuta

(10) Patent No.: US 11,897,302 B2
(45) Date of Patent: Feb. 13, 2024

(54) PREVIEW DAMPING CONTROL APPARATUS AND METHOD FOR A VEHICLE

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 17/494,301

(22) Filed: Oct. 5, 2021

(65) Prior Publication Data
US 2022/0105770 A1 Apr. 7, 2022

(30) Foreign Application Priority Data
Oct. 7, 2020 (JP) ................................ 2020-170065

(51) Int. Cl.
*B60G 17/018* (2006.01)
*B60G 11/26* (2006.01)
(Continued)

(52) U.S. Cl.
CPC .......... *B60G 17/018* (2013.01); *B60G 11/265* (2013.01); *B60G 17/019* (2013.01);
(Continued)

(58) Field of Classification Search
CPC .............. B60G 11/265; B60G 17/0165; B60G 17/018; B60G 17/019; B60G 17/056; B60G 2204/62; B60G 2400/252; B60G 2600/182
(Continued)

(56) References Cited

U.S. PATENT DOCUMENTS

2007/0260438 A1 11/2007 Langer et al.
2012/0203428 A1* 8/2012 Choi ...................... B60G 17/08
701/37
(Continued)

FOREIGN PATENT DOCUMENTS

CN 106240629 A 12/2016
DE 10 2014 200 031 A1 7/2014
(Continued)

OTHER PUBLICATIONS

Office Action dated Sep. 8, 2023 issued in U.S. Appl. No. 17/494,378.
(Continued)

*Primary Examiner* — Hung Q Nguyen
*Assistant Examiner* — Mark L. Greene
(74) *Attorney, Agent, or Firm* — Sughrue Mion, PLLC

(57) ABSTRACT

A damping force control apparatus for a vehicle in which road surface displacement-related information corresponding to left and right wheels detected by a pair of in-vehicle detection devices is transmitted to a preview reference database control device together with the detection position information, a preview reference database including road surface displacement-related values is created, preview damping control that reduces vibration of a sprung of the vehicle is performed using the road surface displacement-related values in the preview reference database, and it is assumed that road surface displacement-related values in predetermined adjacent regions located in a direction crossing a traveling direction of the vehicle with respect to two points where the road surface displacement-related information was detected by the pair of in-vehicle detection devices are the same as an in-phase component of the road surface displacement-related values at the two points.

12 Claims, 8 Drawing Sheets

(51) Int. Cl.
  *B60G 17/056* (2006.01)
  *B60G 17/019* (2006.01)
  *B60G 17/0165* (2006.01)
(52) U.S. Cl.
  CPC ....... *B60G 17/0165* (2013.01); *B60G 17/056* (2013.01); *B60G 2400/252* (2013.01); *B60G 2600/182* (2013.01)
(58) Field of Classification Search
  USPC ..................................................... 280/5.518
  See application file for complete search history.

(56) References Cited

U.S. PATENT DOCUMENTS

| | | |
|---|---|---|
| 2014/0195112 A1 | 7/2014 | Lu et al. |
| 2016/0362133 A1 | 12/2016 | Auden |
| 2017/0129298 A1 | 5/2017 | Lu et al. |
| 2018/0015801 A1 | 1/2018 | Mohamed et al. |
| 2018/0154723 A1 | 6/2018 | Anderson et al. |
| 2022/0105771 A1* | 4/2022 | Furuta ................ B60G 17/0165 |

FOREIGN PATENT DOCUMENTS

| | | |
|---|---|---|
| JP | 2009-257812 A | 11/2009 |
| JP | 2016-111501 A | 6/2016 |
| JP | 2017-226270 A | 12/2017 |

OTHER PUBLICATIONS

Hiroki Furuta, et al., U.S. Appl. No. 17/494,378, filed Oct. 5, 2021.

* cited by examiner

PREVIEW DAMPING CONTROL APPARATUS AND METHOD FOR A VEHICLE

CROSS-REFERENCE TO RELATED APPLICATION

This application claims priority to Japanese Patent Application No. JP2020-170065 filed on Oct. 7, 2020, the content of which is hereby incorporated by reference in its entirety into this application.

BACKGROUND

1. Technical Field

The present disclosure relates to a preview damping control apparatus and method for a vehicle such as an automobile.

2. Description of the Related Art

A preview damping control is a control which reduces vibration of a sprung of a vehicle by controlling a force acting between the sprung and an unsprung based on road surface information such as a vertical displacement of a road surface in front of the vehicle in order to compensate for a control delay, that is, a control that pre-reads road surface information and controls a damping force. As a means of pre-reading information, it is known that road surface information is stored in a cloud to build a database, and road surface information is acquired from the database by communication when a vehicle is traveling. As an example of this type of preview damping control, for example, as described in U.S. Unexamined Patent Application Publication No. 2018/0154723, a preview damping control that acquires road surface information by a sensor such as an in-vehicle camera or a radar sensor is known.

According to sensors such as a camera and a radar sensor, it is possible to acquire road surface information in front of a vehicle over a relatively wide range that crosses a traveling direction of the vehicle. Road surface information in front of a vehicle can also be acquired by a laser sensor, and according to a sensor that detects a vertical motion state quantity of a vehicle such as an unsprung acceleration sensor, it is possible to acquire a vertical displacement of an unsprung and its differential value as road surface information at a wheel position.

According to a laser sensor and a sensor that detects a motion state quantity in the vertical direction of a vehicle, it is possible to acquire road surface information more accurately than the sensors such as a camera and a radar sensor. Therefore, according to a preview damping control using road surface information acquired by a laser sensor or a motion state quantity detection sensor, compared with a preview damping control using road surface information acquired by a camera, a radar sensor, or the like, a vibration of a spring can be effectively reduced.

However, a lateral range in which road surface information can be acquired by a laser sensor and a motion state quantity detection sensor, that is, a range in a direction crossing a traveling direction of a vehicle is much narrower than that of sensors such as a camera and a radar sensor. Therefore, in order to build an effective database that stores road surface information over the entire width of roads and lanes, there is a technical problem that a large number of vehicles must travel on the same road at various lateral positions and a large amount of road surface information must be acquired by a laser sensor or the like.

SUMMARY

One of the objects of the present disclosure is to provide a preview damping control apparatus and method capable of pre-reading effective road surface information and damping a sprung without having to drive a large number of vehicles on the same road at various lateral positions.

The present disclosure provides a preview damping control apparatus for a vehicle comprising:

an in-vehicle control device including a pair of road surface displacement-related information detection devices that detect road surface displacement-related information related to a vertical displacement of at least one of positions of left and right wheels and a position in front of the left and right wheels while the vehicle is traveling, and a first control unit that controls the road surface displacement-related information detection device, a preview reference database control device including a storage device that stores a preview reference database and a second control unit that controls the storage device, the first control unit is configured to associate the road surface displacement-related information detected by each road surface displacement-related information detection device with a position information capable of identifying a position where the road surface displacement-related information was detected, and send the associated information to the second control unit, the second control unit is configured to calculate road surface displacement-related values related to vertical displacements of road surfaces at two points corresponding to the left and right wheels based on detected road surface displacement-related information transmitted from the vehicle or other vehicles, and store sets of data of the road surface displacement-related values and corresponding position information associated with each other in the storage device as a part of the preview reference database, and the first control unit is further configured to perform preview damping control for reducing vibration of a sprung of the vehicle by using the road surface displacement-related value and the position information in the preview reference database.

At least one of the first and second control units is configured to assume that an in-phase component of road surface displacement-related values at two points corresponding to the left and right wheels is the same as a road surface displacement-related value at a point adjacent to one of the two points in a direction crossing a traveling direction of the vehicle.

According to the above configuration, road surface displacement-related information detected by the road surface displacement-related information detection device and position information capable of identifying a position where the road surface displacement-related information was detected are associated and transmitted to the second control unit. In addition, a road surface displacement-related value related to a vertical displacement of a road surface is calculated based on detected road surface displacement-related information transmitted from the vehicle or other vehicles, and a set of data of the road surface displacement-related value and the corresponding position information associated with each other is stored in the storage device as a part of the preview reference database. Further, preview damping control for reducing a vibration of the sprung of the vehicle is performed by using the road surface displacement-related value and the position information in the preview reference database.

Therefore, the first control unit can reduce a vibration of the sprung of the vehicle by pre-reading a road surface displacement-related value and corresponding position information in the preview reference database stored in the storage device by communication and performing the preview damping control.

In general, road surface displacement-related values at the wheel positions and around them are substantially the same, and in particular, road surface displacement-related values around the left and right wheels in the left-right direction are likely to be the same as an in-phase component of road surface displacement-related values at the positions of the left and right wheels. Therefore, road surface displacement-related values around the left and right wheels in the left-right direction may be considered to be the same as an in-phase component of road surface displacement-related values at the positions of the left and right wheels.

According to the above configuration, it is assumed that an in-phase component of road surface displacement-related values at two points corresponding to the left and right wheels is the same as a road surface displacement-related value at a point adjacent to one of the two points in a direction crossing a traveling direction of the vehicle.

Therefore, not only road surface displacement-related values at the two points where the road surface displacement-related information was detected by the road surface displacement-related information detection devices are specified, but also a road displacement-related value at a point adjacent to one of the two points in a direction crossing a direction of travel of the vehicle is also specified. Therefore, the preview damping control can be performed using a set of data for the two points where road displacement-related information was detected and a point adjacent to one of the two points, so that it is possible to pre-read effective road surface displacement-related values and dampen a sprung without requiring a large number of vehicles to travel on the same road in various lateral positions.

In one aspect of the present disclosure, the second control units is configured to assume that a road surface displacement-related value in a predetermined adjacent region located in a direction crossing a traveling direction of the vehicle with respect to the two points where the road surface displacement-related information was detected by the pair of road surface displacement-related information detection devices is the same as an in-phase component of the road surface displacement-related values at the two points.

According to the above aspect, the second control units is configured to assume that a road surface displacement-related value in a predetermined adjacent region located in a direction crossing a traveling direction of the vehicle with respect to the two points where the road surface displacement-related information was detected by the pair of road surface displacement-related information detection devices can be specified to be the same as an in-phase component of the road surface displacement-related values at the two points.

In another aspect of the present disclosure, the second control unit is configured to store a set of assumed data in which an assumed road surface displacement-related value and position information capable of specifying a position in a predetermined adjacent region are associated with each other for the predetermined adjacent region in the storage device as a part of the preview reference database.

According to the above aspect, a set of assumed data in which an assumed road surface displacement-related value and position information capable of specifying a position in a predetermined adjacent region are associated with each other for the predetermined adjacent region is stored in the storage device as a part of the preview reference database. Therefore, for the predetermined adjacent region, a set of assumed data can be stored in the storage device as a part of the preview reference database.

In another aspect of the present disclosure, the second control unit is configured to store the set of assumed data together with identification information indicating that the road surface displacement-related value is the assumed road surface displacement-related value in the storage device as a part of the preview reference database when storing the set of assumed data in the storage device as part of the preview reference database.

According to the above aspect, the set of assumed data together with identification information indicating that the road surface displacement-related value is the assumed road surface displacement-related value is stored in the storage device as a part of the preview reference database when storing the set of assumed data in the storage device as a part of the preview reference database.

Therefore, when the preview damping control is performed using the road surface displacement-related value and the position information in the preview reference database stored in the storage device, it can be determined by the identification information whether or not the road surface displacement-related value is the assumed road surface displacement-related value.

Further, in another aspect of the present disclosure, the second control unit is configured not to store the set of assumed data in the storage device when it is determined that a set of data in which the road surface displacement-related value calculated based on a road surface displacement-related information detected when the vehicle or other vehicles traveled and the position information are associated with each other for a position in the predetermined adjacent region has already been stored in the storage device.

According to the above aspect, the set of assumed data is not stored in the storage device when it is determined that a set of data in which the road surface displacement-related value calculated based on a road surface displacement-related information detected when the vehicle or other vehicles traveled and the position information are associated with each other for a position in the predetermined adjacent region has already been stored in the storage device.

Therefore, a set of data that is already stored in the storage device with a road surface displacement-related value calculated based on detected road surface displacement-related information and position information being associated with each other can be prevented from being overwritten by a set of assumed data to be stored.

Further, in another aspect of the present disclosure, the vehicle has a control force generator configured to generate a control force acting between the sprung and an unsprung, and the first control unit is configured to determine predicted wheel passage positions where the left and right wheels are predicted to pass through, acquire road surface displacement-related values or assumed road surface displacement-related values at the predicted wheel passage positions in the preview reference database by communication, calculate a target preview damping control force for reducing a vibration of the sprung when each wheel passes through the corresponding predicted wheel passage position based on the acquired road surface displacement-related value or the acquired assumed road surface displacement-related value, and control the control force generators so that a control force generated by each control force generator when the corresponding wheel passes through the corresponding predicted wheel passage position becomes the corresponding target preview damping control force.

According to the above aspect, predicted wheel passage positions through which the left and right wheels are predicted to pass are determined, and road surface displacement-related values or assumed road surface displacement-related values at the predicted wheel passage positions in the preview reference database are acquired by communication. Target preview damping control forces for reducing a vibration of the sprung when the left and right wheels pass through the corresponding predicted wheel passage positions are calculated based on the acquired road surface displacement-related values or the acquired assumed road surface displacement-related values. Further, the control force generators are controlled so that control forces generated by the control force generators when the left and right wheels pass through the corresponding predicted wheel passage positions become the corresponding target preview damping control forces.

Therefore, even when a road surface displacement-related value at the predicted wheel passage position is an assumed road surface displacement-related value, a target preview damping control force can be calculated based on the assumed road surface displacement-related value, and the preview damping control can be performed based on the target preview damping control force.

Further, in one aspect of the present disclosure, the first control unit is configured to determine predicted passage positions at which the left and right wheels are expected to pass through, and, when it is determined that no road surface displacement-related value has been calculated for the predicted passage position of one of the left and right wheels, assume that a road surface displacement-related value at the predicted passage position of the one of the wheels is the same as an in-phase component of a road surface displacement-related value calculated for a predetermined adjacent region located in a direction crossing a traveling direction of the vehicle with respect to the predicted passage position of the one of the wheels and a road surface displacement-related value calculated for the predicted passage position of the other of the wheels.

According to the above aspect, when it is determined that no road surface displacement-related value has been calculated for the predicted passage position of one of the left and right wheels, the preview damping control can be performed using a road surface displacement-related value that is assumed to be the same for the predicted passage position of the one of the wheels.

Further, in another aspect of the present disclosure, the vehicle has a control force generator configured to generate a control force acting between the sprung and an unsprung, and the first control unit is configured to determine predicted passage positions of the left and right wheels where the left and right wheels are predicted to pass through, acquire road surface displacement-related values at the predicted wheel passage positions or assumed road surface displacement-related values in the preview reference database by communication, calculate target preview damping control forces for reducing a vibration of the sprung when the left and right wheels pass through the corresponding predicted wheel passage positions based on the acquired road surface displacement-related values or the acquired assumed road surface displacement-related values, and control each control force generators so that a control force generated by each control force generator when the corresponding wheel passes through the corresponding predicted wheel passage position becomes the corresponding target preview damping control force.

According to the above aspect, the preview damping control can be performed so that control forces generated by the control force generators become the corresponding target preview damping control forces calculated based on the road surface displacement-related values or the assumed road surface displacement-related values at the predicted passage positions of the left and right wheels.

Further, in one aspect of the present disclosure, the first control unit is configured to reduce the target preview damping control force when it is determined that a road surface displacement-related value of the predicted wheel passage position acquired by communication is an assumed road surface displacement-related value.

Since the reliability of an assumed road surface displacement-related value is lower than the reliability of a road surface displacement-related value based on a detected value, the reliability of a target preview damping control force calculated based on an assumed road surface displacement-related value is lower than the reliability of a target preview damping control force calculated based on a road surface displacement-related value based on a detected value.

According to the above aspect, the target preview damping control force is reduced when it is determined that a road surface displacement-related value at the predicted wheel passage position acquired by communication is an assumed road surface displacement-related value. Therefore, as compared to where the target preview damping control force is not reduced even when a road surface displacement-related value is an assumed road surface displacement-related value, it is possible to reduce the possibility that an inappropriately large damping control force is generated.

Further, in another aspect of the present disclosure, the in-vehicle control device is configured to perform other damping control that calculates other target damping control force other than the target preview damping control force, and control the control force generator so that a control force generated by the control force generator when the wheel passes through the predicted wheel passage position becomes the other target damping control force, and the first control unit is configured to increase a control force generated based on the other target damping control force when it is determined that a road surface displacement-related value at the predicted wheel passage position acquired by communication is an assumed road surface displacement-related value.

According to the above aspect, other target damping control force other than the target preview damping control force is calculated, and other damping control is performed to control the control force generator so that a control force generated by the control force generator when the wheel passes through the predicted wheel passage position becomes the other target damping control force. Further, a control force generated based on the other target damping control force is increased when it is determined that a road surface displacement-related value at the predicted wheel passage position acquired by communication is an assumed road surface displacement-related value.

Therefore, as compared to where other damping control is not performed, a vibration of the sprung can be effectively reduced even when a road surface displacement-related value is an assumed road surface displacement-related value. In particular, when a control force generated based on the target preview damping control force is reduced in a situation where a road surface displacement-related value is an assumed road surface displacement-related value, a damping control force is supplemented with a control force of other damping control, so that the risk of insufficient damping control force can be reduced.

Further, in another aspect of the present disclosure, the second control unit stores road surface section information in which a road surface of each road in the preview reference database is divided into a plurality of road surface sections in advance, and is configured to store position information that can identify a road surface section in the storage device as position information corresponding to a calculated road surface displacement-related value.

According to the above aspect, road surface section information in which a road surface of each road in the preview reference database is divided into a plurality of road surface sections in advance is stored, and position information that can identify the road surface section is stored in the storage device as position information corresponding to a calculated road surface displacement-related value.

Thus, the preview reference database including a set of data for each road surface section can be stored in the storage device. Therefore, as compared to where sets of data for each point where a road surface displacement-related information is detected and each point in an adjacent region are stored in the storage device as a part of the preview reference database, the number of data sets can be reduced and a storage capacity of the storage device can be reduced.

Further, the present disclosure provides a preview damping control method for a vehicle for reducing a vibration of a sprung of the vehicle using an in-vehicle control device including a pair of road surface: displacement-related information detection devices that detects road surface displacement-related information related to a vertical displacement of at least one of positions of left and right wheels and positions in front of the left and right wheels I while the vehicle is traveling, and a first control unit that controls the road surface displacement-related information detection device, and a preview reference database control device including a storage device that stores a preview reference database and a second control unit that controls the storage device.

The damping force control method comprises:

a step of associating road surface displacement-related information detected by the road surface displacement-related information detection device with position information capable of identifying a position where the road surface displacement-related information was detected and transmitting the associated information to the second control unit, a step of calculating a road surface displacement-related value related to a vertical displacement of a road surface based on road surface displacement-related information transmitted from the vehicle or other vehicles, a step of storing a set of data of the calculated road surface displacement-related value and the corresponding position information associated with each other in the storage device as a part of the preview reference database, a step of performing preview damping control using the road surface displacement-related information and the position information in the preview reference database, and a step of assuming that an in-phase component of the road surface displacement-related values at two points corresponding to the left and right wheels is the same as a road surface displacement-related value at a point adjacent to one of the two points in a direction crossing a traveling direction of the vehicle in at least one of the step of storing a set of data in the storage device and the step of performing the preview damping control.

According to the above control method, as in the preview damping control apparatus, a vibration of the sprung of the vehicle can be reduced by pre-reading a road surface displacement-related value and corresponding position information in the preview reference database stored in the storage device and performing the preview damping control.

Further, according to the above control method, a set of data for two points where road surface displacement-related information was detected and a point adjacent to one of the two points can be stored in the storage device, and the preview damping control can be performed for those points. Therefore, it is possible to pre-read effective road surface displacement-related values and dampen a vibration of the sprung without requiring for a large number of vehicles to travel on the same road at various lateral positions.

Other objects, other features and attendant advantages of the present disclosure will be readily understood from the description of the embodiments of the present disclosure described with reference to the following drawings.

BRIEF DESCRIPTION OF THE DRAWINGS

The present disclosure will now be described in detail with reference to the accompanying drawings.

DETAILED DESCRIPTION

First Embodiment

<Configuration>

Figure 1:
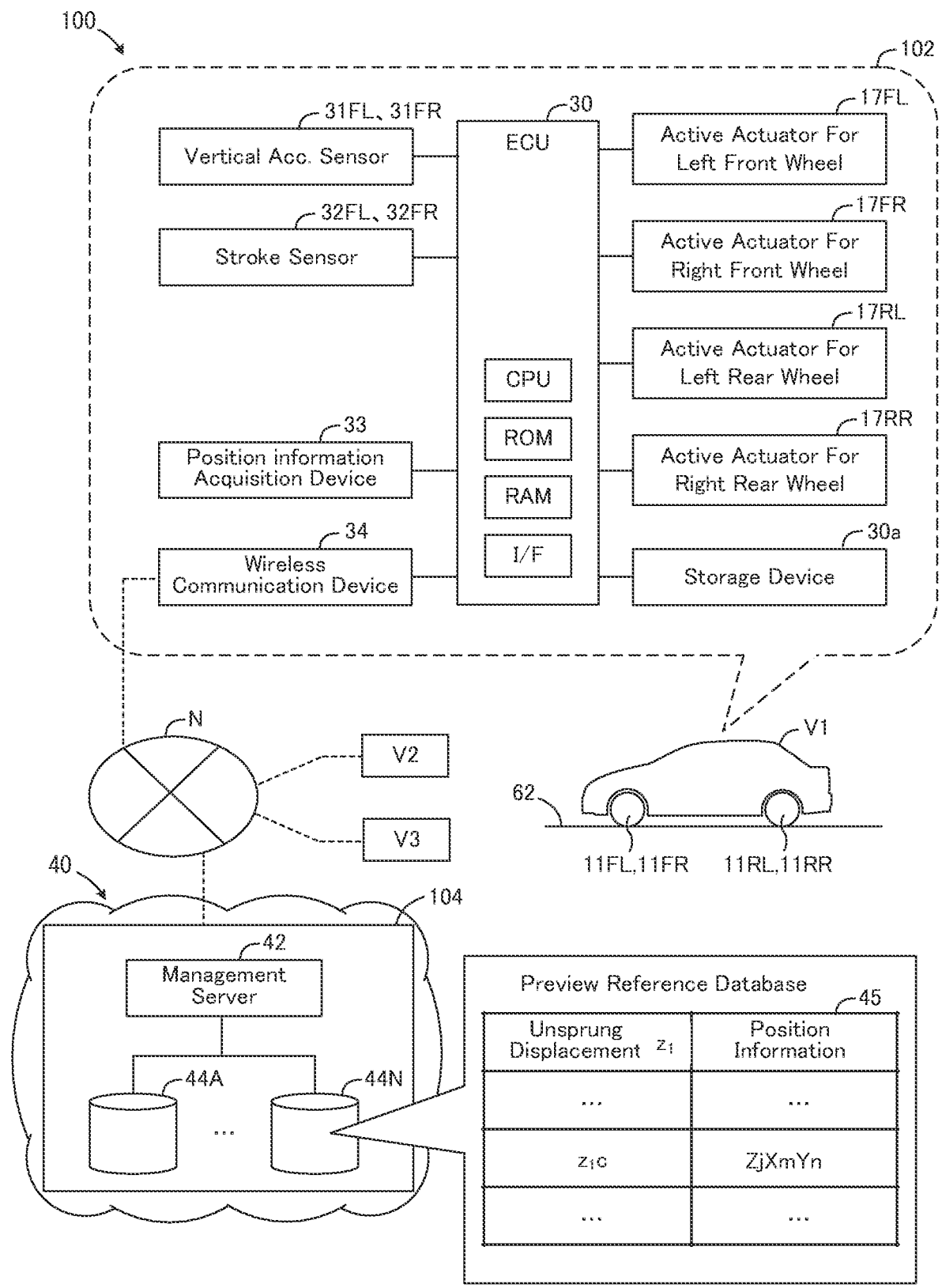
FIG. 1 is a schematic configuration diagram showing a preview damping control apparatus according to an embodiment.

In the first embodiment, a preview damping control apparatus 100 includes an in-vehicle device 102 mounted on a vehicle V1 and a preview reference database control device 104 installed outside the vehicle, as shown in FIG. 1.

The in-vehicle device 102 includes an ECU 30 that function as a first control unit, a storage device 30a, a position information acquisition device 33, and a wireless communication device 34. Further, the in-vehicle device 102 includes active actuators 17FL, 17FR, 17RL and 17RR provided corresponding to a left front wheel 11FL, a right front wheel 11FR, a left rear wheel 11RL and a right rear wheel 11RR of the vehicle V1, respectively. The left front wheel 11FL, the right front wheel 11FR, the left rear wheel 11RL, and the right rear wheel 11RR are referred to as a wheel 11 as necessary. The active actuators 17FL to 17RR function as a control force generator configured to generate a control force acting between a sprung and an unsprung, and are referred to as an active actuator 17 as necessary.

Although a control force that can be generated is limited, the control force generator may be an active stabilizer device, a shock absorber of a variable damping force type, or the like. Further, a suspension in which a wheel includes an in-wheel motor, that is, a suspension in which a front-rear force of the wheel is converted into a vertical force using geometry of the suspension, AVS (Adaptive Variable Suspension System), etc may be used as a suspension capable of generating a control force.

Figure 2:
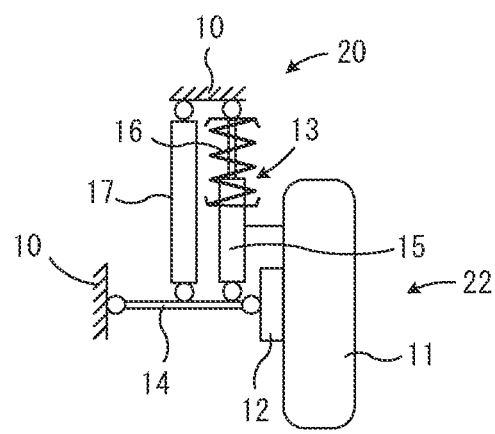
FIG. 2 is a diagram showing a suspension including an active actuator.

As shown in FIG. 2, each wheel 11 of the vehicle V1 is rotatably supported by a wheel support member 12. The vehicle V1 is provided with a suspension 13 corresponding to each wheel 11, and the suspension 13 may be an independent suspension type suspension. Each suspension 13 suspends corresponding wheels from a vehicle body 10, and includes a suspension arm 14, a shock absorber 15, and a suspension spring 16.

The suspension arm 14 connects the wheel support member 12 to the vehicle body 10. Although only one suspension arm 14 is shown for one suspension 13 in FIG. 2, a plurality of suspension arms 14 may be provided for one suspension 13.

In FIG. 2, the shock absorber 15 and the suspension spring 16 are arranged between the vehicle body 10 and the suspension arm 14, but may be arranged between the vehicle body 10 and the wheel support member 12. The suspension spring 16 may be a spring other than a coil spring.

As is well known, among the members such as the vehicle body 10 of the vehicle V1 and the shock absorber 15 and the like, the portions of the members on the vehicle body 10 side with respect to the suspension spring 16 is a sprung 20. On the other hand, among the members such as the wheel 11 of the vehicle V1 and the shock absorber 15, the portions of the members on the wheel 11 side with respect to the suspension spring 16 is an unsprung 22.

Further, the active actuator 17 is arranged between the vehicle body 10 and the suspension arm 14 in parallel with the shock absorber 15 and the suspension spring 16. The active actuator 17 is configured to generate a control force acting between the sprung 20 and the unsprung 22, and the control force is controlled by the active actuator 17 being controlled by the ECU 30.

The ECU 30 includes a microcomputer, and the microcomputer includes a CPU, a ROM, a RAM, an interface (I/F), and the like. The CPU realizes various functions by executing instructions (programs, routines) stored in the ROM.

The ECU 30 is connected to a non-volatile storage device 30a capable of reading and writing information. The ECU 30 can store information in the storage device 30a and read out information stored in the storage device 30a. The storage device 30a is a hard disk drive in the present embodiment, but is not limited to the hard disk drive, and may be a well-known storage device or storage medium capable of reading and writing information.

The in-vehicle device 102 is provided with sprung vertical acceleration sensors 31FL, 31FR and stroke sensors 32FL, 32FR corresponding to the left and right front wheels 11FL, 11FR. These vertical acceleration sensors and stroke sensors are in-vehicle sensors and are connected to the ECU 30. These vertical acceleration sensors and stroke sensors function as a road surface displacement-related information detection device that detects road surface displacement-related information related to a vertical displacement of a road surface at positions of the left and right front wheels at predetermined time intervals while the vehicle V1 is traveling.

The "road surface displacement-related information" may be at least one of an unsprung displacement representing a vertical displacement of the unsprung of the vehicle, an unsprung velocity which is a time derivative value of the unsprung displacement, a road surface displacement representing a vertical displacement of a road surface, a road surface velocity which is a time derivative of the road surface displacement, and a physical quantity that can be a basis of calculating these values. Further, the "road surface displacement-related value" described later may be one of the unsprung displacement representing a vertical displacement of the unsprung of the vehicle and a road surface displacement representing a vertical displacement of a road surface. Therefore, the "road surface displacement-related information" and the "road surface displacement-related value" are specifically information and values related to road surface unevenness, non-flatness, lateral inclination, longitudinal inclination and the like.

The road surface displacement-related information detection device that detects road surface displacement-related information at positions of the left and right front wheels may be a vertical acceleration sensor that detects a vertical acceleration of the unsprung 22. Further, a laser sensor may be adopted as a road surface displacement-related information detection device that detects road surface displacement-related information at positions in front of the left and right front wheels.

The vertical acceleration sensors 31FL and 31FR are provided at portions corresponding to the left and right front wheels, respectively of the vehicle body 10 (the sprung). The vertical acceleration sensors 31FL and 31FR each detect a vertical acceleration (sprung acceleration $ddz_2fl$ and $ddz_2fr$) of the corresponding portions of the sprung 20 and output a signal representing the vertical acceleration to the ECU 30. The vertical acceleration sensors 31FL and 31FR are referred to as "vertical acceleration sensors 31" when it is not necessary to distinguish them. Similarly, the sprung acceleration $ddz_2fl$ and $ddz_2fr$ are referred to as "sprung acceleration $ddz_2$".

The stroke sensors 32FL and 32FR are provided on the left and right front wheel suspensions 13, respectively. The stroke sensors 32FL and 32FR detect vertical strokes Hfl and Hfr of the corresponding suspension 13, respectively, and each output a signal indicating the vertical stroke to the ECU 30. The strokes Hfl and Hfr are vertical relative displacements between the vehicle body 10 (sprung) corresponding to the positions of the left and right front wheels and the corresponding wheel support member 12 (unsprung), respectively. The stroke sensors 32FL and 32FR are referred to as "a stroke sensor 32" when it is not necessary to distinguish them. Similarly, strokes Hfl and Hfr are referred to as "a stroke H".

Further, as shown in FIG. 1, the ECU 30 is connected to the position information acquisition device 33 and the wireless communication device 34.

The position information acquisition device 33 includes a GNSS (Global Navigation Satellite System) receiver and a map database. The GNSS receiver receives a "signal from an artificial satellite (for example, a GNSS signal)" for detecting a current time position (current position) of the vehicle V1. Road map information and the like are stored in the map database. The position information acquisition device 33 is a device that acquires a current position (for example, latitude and longitude) of the vehicle V1 based on the GNSS signal, and is, for example, a navigation device.

The wireless communication device 34 is a wireless communication terminal for communicating with a preview reference database control device 104 provided in a cloud 40 via a network N. As shown in FIG. 1, other vehicles V2 and V3 also have the same in-vehicle devices as the in-vehicle device 102 of the vehicle V1, and their wireless communication devices can also communicate with the preview reference database control device 104 via the network N. In the present embodiment shown in FIG. 1, there are two other vehicles, V2 and V3, but the number of the other vehicles may be a large number more than three.

The control device 104 includes a management server 42 connected to the network and a plurality of storage devices 44A to 44N, and the management server 42 functions as a second control unit. The storage devices 44A to 44N are referred to as "a storage device 44" when it is not necessary to distinguish between them. The storage device 44 functions as a storage device outside the vehicle of the preview damping control apparatus 100.

The management server 42 may be an ECU including a CPU, a ROM, a RAM, an interface (I/F), and the like. The management server 42 searches and reads a data stored in the storage device 44, and writes a data to the storage device 44.

The storage device 44 stores a preview reference database (hereinafter, simply referred to as "database") 45, which is a map for preview damping control. In the database 45, an unsprung displacement $z_1$ calculated based on road surface displacement-related information detected when the vehicle V1 or another vehicle V2 or V3 actually travels is registered in association with position information that can specify a position where the road surface displacement-related information was detected. Therefore, the database 45 is data of a combination of an unsprung displacement $z_1$ calculated based on road surface displacement-related information and position information at which a position where the road surface displacement-related information was detected can be specified. The calculation of an unsprung displacement $z_1$ and position information will be described in detail later.

Figure 3:
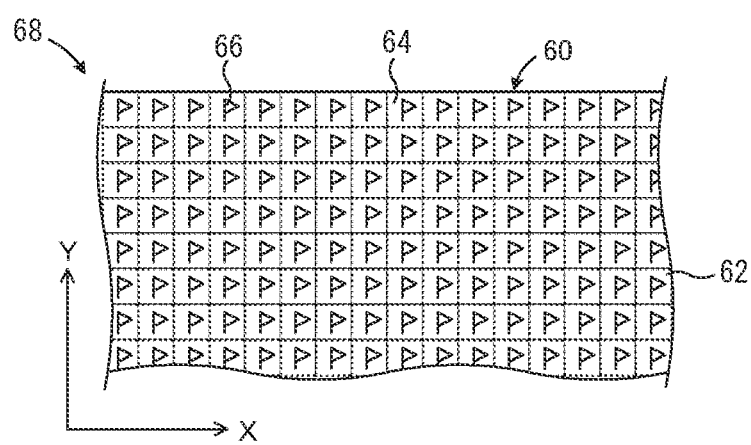
FIG. 3 is a diagram showing an example of road surface section information stored in a preview reference database.

In the present embodiment, the management server 42 stores the information of each road, and as shown in FIG. 3, stores road surface section information 68 in which a road surface 62 of each road 60 is divided into a plurality of road surface sections 64 in advance as map information indicating road surface areas of each road in the database 45. X direction may be, for example, the north direction of the grovel direction, and Y direction may be a direction perpendicular to the X direction. The positions of the road surface sections 64 in the X direction and the Y direction are represented by indexes Xm (m=1, 2, 3 . . . ) and indexes Yn (n=1, 2, 3 . . . ), respectively.

In FIG. 3, a strip-shaped region shown by the solid line is a region corresponding to the road 60, and the dotted line is a line indicating the road surface sections 64. A size of the road surface sections 64 affects resolution of the database (map) 45. That is, the larger the size of the road surface sections 64, the lower the resolution of the database 45, and conversely, the smaller the size of the road surface sections 64, the higher the resolution of the database 45. The size and shape of each road surface section 64 may be determined according to a size and shape of a ground contact area of a tire of the wheel and ease of the control, and the shape of each road surface section of the present embodiment is a square having a side length of a constant value from 50 to 150 mm, typically 100 mm.

In the initial state of the database 45, the unsprung displacement $z_1$ of each road surface section 64 is assumed to be an initial value (for example, 0), and an assumption flag 66 of each road surface section 64 is set to ON. A fact that the assumption flag 66 is ON means that an unsprung displacement stored in the storage device 44 for the corresponding road surface section 64 is an initial value or an assumed unsprung displacement. The assumed unsprung displacement will be described later. Therefore, the assumption flag 66 functions as identification information indicating whether or not the unsprung displacement stored in the storage device 44 is an initial value or an assumed unsprung displacement.

In the present embodiment, the position information stored in the storage device 44 by the management server 42 is the position information that can identify the road surface section 64. As shown in FIG. 1, the position information associated with, for example, the unsprung displacement $z_1c$ registered in the database 45 may be expressed as "ZjXmYn" (Zj is an identification number of each road 60 and j is a positive integer) that specifies the road surface section 64.

Further, the ECU 30 is connected to each of the left front wheel active actuator 17FL, the right front wheel active actuator 17FR, the left rear wheel active actuator 17RL, and the right rear wheel active actuator 17RR via a drive circuit (not shown).

The ECU 30 calculates a target control force Fct for reducing a vibration of the sprung of each wheel 11 based on an unsprung displacement $z_1$ at the predicted wheel passage position described later of each wheel 11, and controls the active actuator 17 so that a control force Fc generated by the active actuator 17 becomes the target control force Fct when each wheel 11 passes through the predicted wheel passage position.

<Outline of Preview Damping Control>

An outline of the basic preview damping control performed by the damping control apparatus 20 will next be described.

Although not shown in the figure, a mass of the sprung is represented as $m_2$, and an unsprung displacement, that is, a displacement in the vertical direction of the unsprung is represented as $z_1$. A displacement of the sprung, that is, a displacement in the vertical direction of the sprung at the position of each wheel 11 is represented as $z_2$. A spring constant (equivalent spring constant) of a spring (the suspension spring 16 and the like) of the suspension 13 is represented as K, and a damping coefficient (equivalent damping coefficient) of a damper (the shock absorber 15 and the like) of the suspension 13 is represented as C. A control force generated by the actuator 17 is represented as Fc.

Time derivative values of z1 and z2 are represented as dz1 and dz2, respectively. Second order time derivative values of z1 and z2 are represented as ddz1 and ddz2, respectively. The values of z1 and z2 become positive when the respective parts move upward. The forces generated by the spring, the damper, and the actuator 17 and the like have positive signs when direction of the forces generated by them is upward.

A motion equation for a vertical movement of the sprung 20 of the vehicle V1 is expressed by the following equation (1).

$$m_2 \cdot ddz_2 = C \cdot (dz_1 - dz_2) + K \cdot (z_1 - z_2) - Fc \quad (1)$$

It is assumed that the damping coefficient C in the equation (1) is constant. However, since an actual damping coefficient changes according to a stroke speed of the suspension 13, for example, it may be variably set according to the time derivative value of the stroke H.

When a vibration of the sprung is completely canceled (eliminated) by the control force Fc (in other words, when the acceleration $ddz_2$, the velocity $dz_2$, and the displacement $z_2$ of the sprung are made to be zero), the control force Fc is expressed as the following equation (2).

$$Fc = C \cdot dz_1 + K \cdot z_1 \tag{2}$$

Therefore, the control force Fc that reduces the vibration of the sprung can be expressed by the following equation (3) with a control gain as $\alpha$. The control gain $\alpha$ is an arbitrary constant greater than 0 and less than or equal to 1.

$$Fc = \alpha \cdot (C \cdot dz_1 + K \cdot z_1) \tag{3}$$

By applying the equation (3) to the equation (1), the equation (1) can be expressed as the following equation (4).

$$m_2 \cdot ddz_2 = C \cdot (dz_1 - dz_2) + K \cdot (z_1 - z_2) - \alpha \cdot (C \cdot dz_1 + K \cdot z_1) \tag{4}$$

When a Laplace transform is performed for the equation (4), and then the result is deformed, the equation (4) can be expressed as the following equation (5). In the equation (5), "s" represents a Laplace operator.

$$\frac{z_2}{z_1} = \frac{(1-\alpha)(Cs+K)}{m_2 s^2 + Cs + K} \tag{5}$$

As understood from the equation (5), a magnitude of the transfer function varies depending on $\alpha$, and becomes minimum when $\alpha$ is equal to 1. Therefore, a target control force Fct can be expressed by the following equation (6) corresponding to the equation (3). A gain $\beta_1$ in the equation (6) corresponds to $\alpha Cs$, and a gain $\beta_2$ corresponds to $\alpha K$.

$$Fct = \beta_1 \cdot dz_1 + \beta_2 \cdot z_1 \tag{6}$$

Therefore, the ECU 30 of the in-vehicle device 102 acquires in advance (previews) an unsprung displacement $z_1$ and its time derivative $dz_1$ at a position where the wheel 11 passes through later (predicted wheel passage position) by communication from the database control device 104, and applies the acquired unsprung displacement $z_1$ to the equation (6) to calculate a target control force Fct. Then, the ECU 30 make the actuator 17 generate a control force Fc corresponding to the target control force Fct at a timing when the wheel 11 passes through the predicted wheel passage position (that is, at a timing when the unsprung displacement $z_1$ applied to the equation (6) occurs). In this way, it is possible to reduce a vibration of the sprung that occurs when the wheel 11 passes through the predicted wheel passage position.

The above is the damping control of the sprung, and the damping control of the sprung based on an unsprung displacement $z_1$ acquired in advance is the preview damping control in this embodiment and other embodiments described later.

It should be noted that, in the above explanation, a mass of the unsprung and an elastic deformation of a tire are ignored so that a road surface vertical displacement $z_0$ is deemed to be substantially the same as the unsprung displacement $z_1$. Therefore, the preview damping control can be carried out using a vertical displacement $z_0$ of a road surface in place of the unsprung displacement $z_1$.

The following equation (7) is an equation for simply calculating a target control force Fct by omitting the derivative term ($\beta_1 \cdot dz_1$) of the above equation (6). Even when a target control force Fct is calculated according to the equation (7), a control force ($=\beta_2 \cdot z_1$) for reducing a vibration of the sprung is generated by the actuator 17, so that the vibration of the sprung can be reduced as compared to where this control force is not generated.

$$Fct = \beta_2 \cdot z_1 \tag{7}$$

<Database Making Routine in the First Embodiment>

Figure 5:
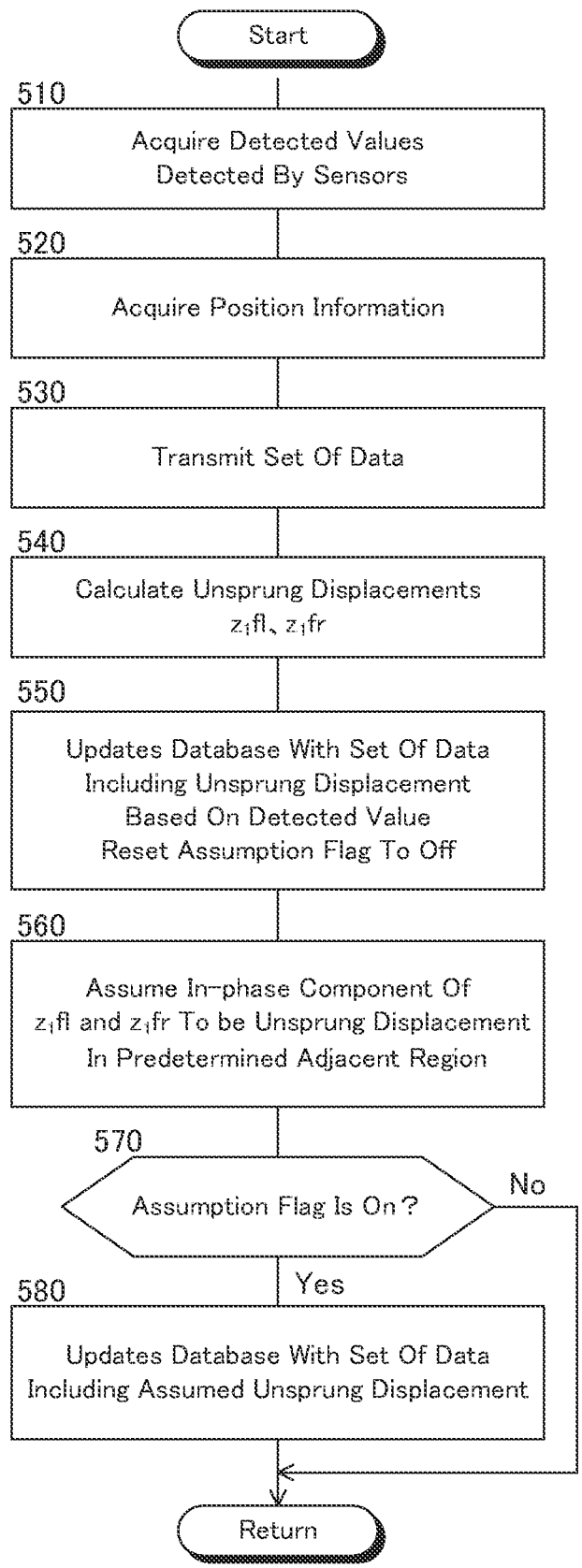
FIG. 5 is a flowchart showing a preview reference database generation routine of the first embodiment.

In the first embodiment, the database is made by executing the database making routine shown in the flowchart of FIG. 5 at predetermined elapsed time intervals. Steps 510 to 530 are executed by the CPU of the ECU 30, and steps 530 to 580 are executed by the CPU of the management server 42.

First, in step 510, the CPU acquires sprung accelerations $ddz_2$fl and $ddz_2$fr detected by the vertical acceleration sensors 31FL and 31FR, respectively and strokes Hfl and Hfr detected by the stroke sensors 32FL and 32FR, respectively. These pieces of information are road surface displacement-related information related to vertical displacements of a road surface at the positions of the left and right front wheels.

In step 520, the CPU acquires a current position and a traveling direction based on a traveling path of the vehicle V1 from the position information acquisition device 33, and, based on them, acquires position information that can specify a position (a position of the wheel 11) at which the road surface displacement-related information was acquired. In this case, the position information acquisition device 33 specifies the current position and the traveling direction based on information on automatic driving, information on GNSS, and the like. Since various existing methods may be adopted for specifying the current position and the traveling direction, detailed description of specifying the current position and the traveling direction will be omitted. The current position and the traveling direction of the vehicle V1 are position information that can specify a position at which the road surface displacement-related information was acquired.

In step 530, the CPU of the ECU 30 transmits to the management server 42 via the wireless communication device 34 and the network a set of data in which the road surface displacement-related information and the position information acquired in steps 510 and 520 are associated. The CPU of the management server 42 stores the received information in a storage device (not shown in FIG. 1).

The data set may be transmitted by the CPU of the ECU 30 sequentially every time steps 510 and 520 are completed, but the information acquired in steps 510 and 520 may temporarily be stored in the storage device 30a or the like, and a series of temporarily stored information may be transmitted to the management server 42 at predetermined time intervals.

In step 540, the CPU calculates unsprung displacements $z_1$fl and $z_1$fr corresponding to the left and right front wheels by offline data processing based on the sprung accelerations $ddz_2$fl and $ddz_2$fr and the strokes Hfl and Hfr received in step 530, respectively. Each unsprung displacement may be calculated in any manner known in the art, for example using an offline filter and an ideal integral, as a difference between the second-order integral of the unsprung displacement and the stroke.

Notably, unsprung displacements $z_1$ may be calculated by integrating unsprung vertical accelerations detected by the unsprung vertical acceleration sensors provided corresponding to the left and right front wheels in the second order. Further, unsprung displacements $z_1$ may be calculated by using an observer known in the art based on at least one of the vertical acceleration of the sprung, a suspension stroke, and a vertical acceleration of the unsprung at each wheel position. Further, unsprung displacements $z_1$ may be calculated based on vertical displacements of a road surface at positions in front of the left and right front wheels detected by the laser sensor.

In particular, in this embodiment, an unsprung displacement $z_1$ is calculated for each road surface section 64. The calculation procedure of an unsprung displacement $z_1$ for the road surface section will be described with reference to FIG. 4.

Figure 4:
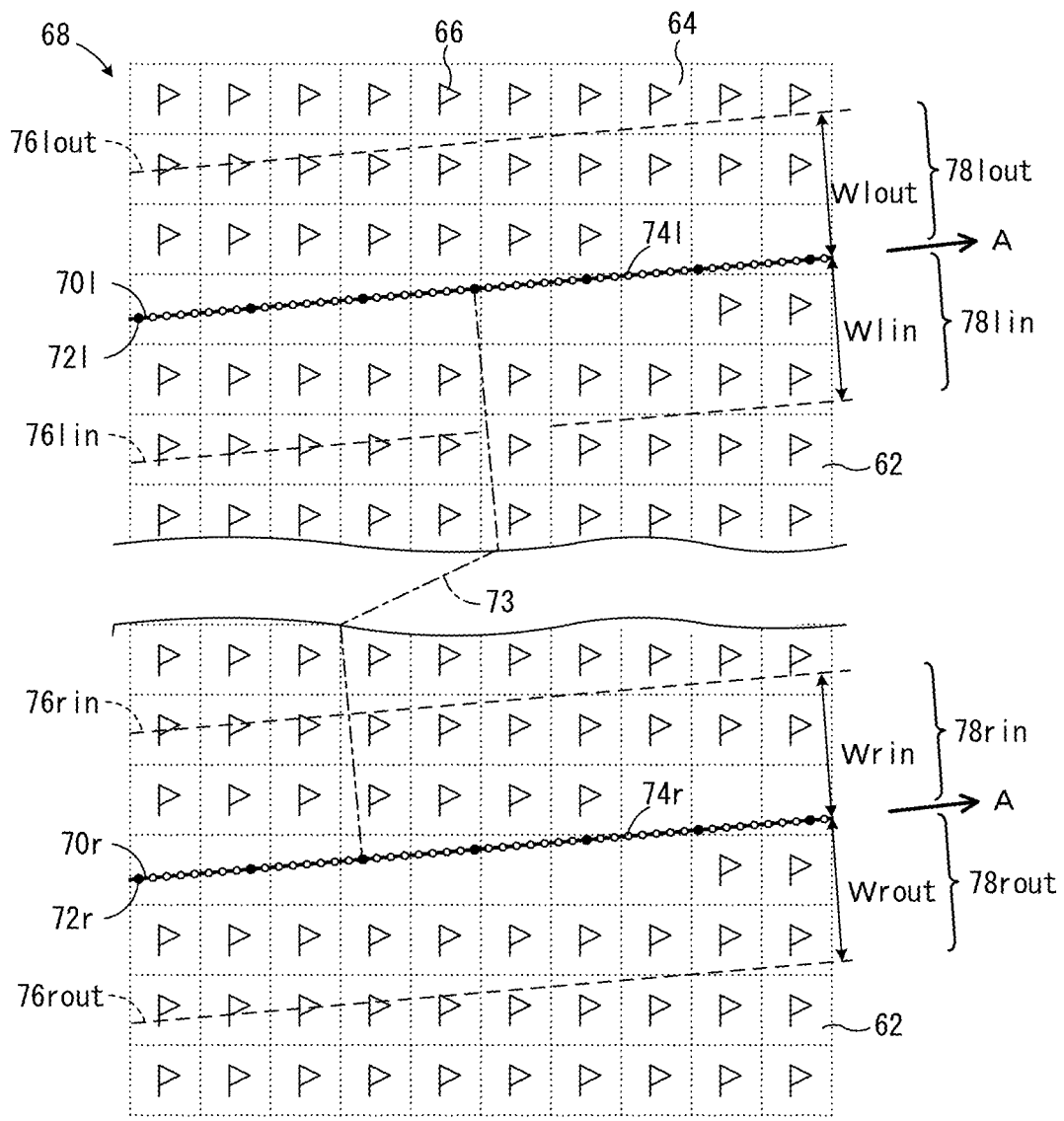
FIG. 4 is a figure which shows a procedure for assuming that an unsprung displacement of a road surface section in predetermined adjacent regions adjacent to a specified road surface section is the same as the unsprung displacement of the specified road surface section in the first embodiment.

In FIG. 4, the thick solid lines 70*l* and 70*r* show straight lines corresponding to examples of movement loci of centers (not shown) of ground contact regions of tires of the left front wheel 11FL and right front wheel 11FR, respectively. The arrows A indicate a moving direction of the left front wheel 11FL and right front wheel 11FR, and for convenience of explanation, it is assumed that the moving direction of the left and right front wheels is the same as a traveling direction of the vehicle V1.

The black circles 72*l* and 72*r* on the thick solid lines 70*l* and 70*r* indicate points where detected values are detected by sensors such as the left and right sprung vertical acceleration sensors 31FL and 31FR, respectively, and an unsprung displacement based on the detected value is calculated as an unsprung displacement of a road surface section to which these points belong. The positions of the black circles 72*l* and 72*r* in the road surface section information 68 indicating a road surface area in the database 45 may be determined by synchronizing the detected values included in the set of data received in step 530 with the positions of the left and right front wheels determined based on the position of the vehicle V1 and the direction of traveling.

The detected value of each sensor is acquired at a frequency corresponding to a sampling frequency of the sensor. Since the sampling frequency is constant, a distance between the points where the detected values are acquired (that is, a distance between the black circles 72*l* and 72*r* each in FIG. 4) increases as the vehicle speed Vv1 increases. For example, assuming that the sampling frequency is 100 Hz and the vehicle speed is 100 km/h, the distance between the points where the detected values are acquired is about 278 mm, which is larger than the side and diagonal lengths of the road surface section 64.

Therefore, the number of black circles 72*l* and 72*r* along the moving direction of the wheels is smaller than the number of road surface sections 64 along the moving direction of the wheels. Therefore, the CPU of the management server 42 performs resampling to complement the unsprung displacement for a region between two points corresponding to two unsprung displacements calculated one after the other based on the detected values, that is, a region between two black circles 72*l* and 72*r* each adjacent to each other. That is, the detected values included in the set of data received in step 530 are resampled and complementary unsprung displacements are calculated based on the resampled detected values so that there are estimated unsprung displacements between the two black circles 72*l* and 72*r* each, for example every 10 mm. The white circles 74*l* and 74*r* in FIG. 4 each indicate a point corresponding to the complementary unsprung displacement.

Resampling of a detected value may be performed by any method known in the art. Description of resampling a detected value will be omitted.

Further, the CPU of the management server 42 calculates an average value of the unsprung displacements or an average value of the unsprung displacements based on the complementary unsprung displacements and the detected values belonging to each road surface section 64 as an unsprung displacement of the road surface section. Thus, unsprung displacements based on the detected values are acquired for all the road surface sections 64 through which the thick solid lines 70*l* and 70*r* passes in FIG. 4.

In step 550, the CPU identifies the road surface section corresponding to the position where the road surface displacement-related information was acquired based on the position information received in step 530. Further, the CPU stores a set of data in which the specified road surface section and the unsprung displacement calculated in step 540 (the unsprung displacement based on the detected value) are associated with each other in the storage device 44 as a part of the database. That is, the CPU updates the database with the unsprung displacement based on the detected value for the specified road surface section.

The CPU switches an assumption flag OFF when the assumption flag of the specified road surface section is ON. Further, when the unsprung displacement based on the detected value is already stored for the specified road surface section, the unsprung displacement calculated in step 540 may be stored by overwriting, or an average value of the already stored unsprung displacement and the calculated unsprung displacement may be stored.

In step 560, the CPU assumes that an in-phase component of the unsprung displacements $z_1 fl$ and $z_1 fr$ of the two road surface sections corresponding to the left and right front wheels identified in step 550 is the same as unsprung displacements of road surface sections in predetermined adjacent regions adjacent to the two road surface sections. As a result, unsprung displacements of the road surface sections in two predetermined adjacent regions are determined to be an assumed unsprung displacement calculated based on the unsprung displacements based on the detected values. An in-phase component of the unsprung displacements $z_1 fl$ and $z_1 fr$, that is, an assumed unsprung displacement may be calculated by $(z_1 fl + z_1 fr)/2$.

In FIG. 4, the alternate long and short dash line 73 connecting the black circles 72*l* and 72*r* indicates a pair of black circles corresponding to each other. The reference numerals 78*lin* and 78*lout* indicate predetermined adjacent regions inside and outside the vehicle V1 with respect to the solid line 70*l*, respectively, and Wlin and Wlout indicate widths of the predetermined adjacent regions 78*lin* and 78*lout*, respectively. The broken lines 76*lin* and 76*lout* indicate boundaries of the predetermined adjacent regions 78*lin* and 78*lout*, respectively.

Similarly, in FIG. 4, the reference numerals 78*rin* and 78*rout* indicate predetermined adjacent regions inside and outside the vehicle V1 with respect to the solid line 70*r*, respectively, and Wrin and Wrout indicate widths of predetermined adjacent regions 78*rin* and 78*rout*, respectively. The broken lines 76*rin* and 76*rout* indicate boundaries of the predetermined adjacent regions 78*rin* and 78*rout*, respectively. When it is not necessary to distinguish the widths Wlin, Wlout, Wrin and Wrout of the predetermined adjacent regions, they are referred to as a width W of the predetermined adjacent regions.

In FIG. 4, the widths Wlin, Wlout, Wrin and Wrout of the predetermined adjacent regions are the same, but may be different from each other. In particular, the widths Wlin and Wrin may be larger than Wlout and Wrout, respectively, and may be a distance between a center of the vehicle and centers of ground contact points of the left front wheel 11FL and the right front wheel 11FR, respectively. In other words, the predetermined adjacent regions 78*lin* and 78*rin* may be regions between the centers of the ground contact points of the left front wheel 11FL and the right front wheel 11FR.

In the present embodiment, adjacency is the adjacency in the direction perpendicular to the traveling direction of the vehicle V1, but the adjacent direction may be a direction that crosses a traveling direction of the vehicle V1, and may be, for example, a direction perpendicular to a longitudinal direction of the vehicle V1 or a direction perpendicular to a lane. Further, the width W of the predetermined adjacent regions 78 in the direction crossing the traveling direction of the vehicle V1 is set to a range larger than a width of tires (not shown) of the left and right front wheels and not exceeding a lane. Further, the widths Wlin, Wlout, Wrin and Wrout on both sides of the thick solid lines 70*l* and 70*r* may have different values from each other.

In step 570, the CPU sequentially determines whether or not the assumption flag is ON for each road surface section in the predetermined adjacent region. Further, when the CPU makes a negative determination in each determination, that is, it determines that a set of data including the unsprung displacement based on the detected value is already stored, it temporarily terminates the control by the routine shown in FIG. 5 without storing the set of data.

On the contrary, when the CPU makes an affirmative determination, it stores a set of data in which the unsprung displacement (assumed unsprung displacement) assumed to be the same in step 580 and the road surface section are associated with each other in the storage device 44 as a part of the database. That is, the CPU updates the database with the assumed sprung displacement for the road surface section in the predetermined adjacent region.

<Preview Damping Control Routine in the First Embodiment>

Figure 6:
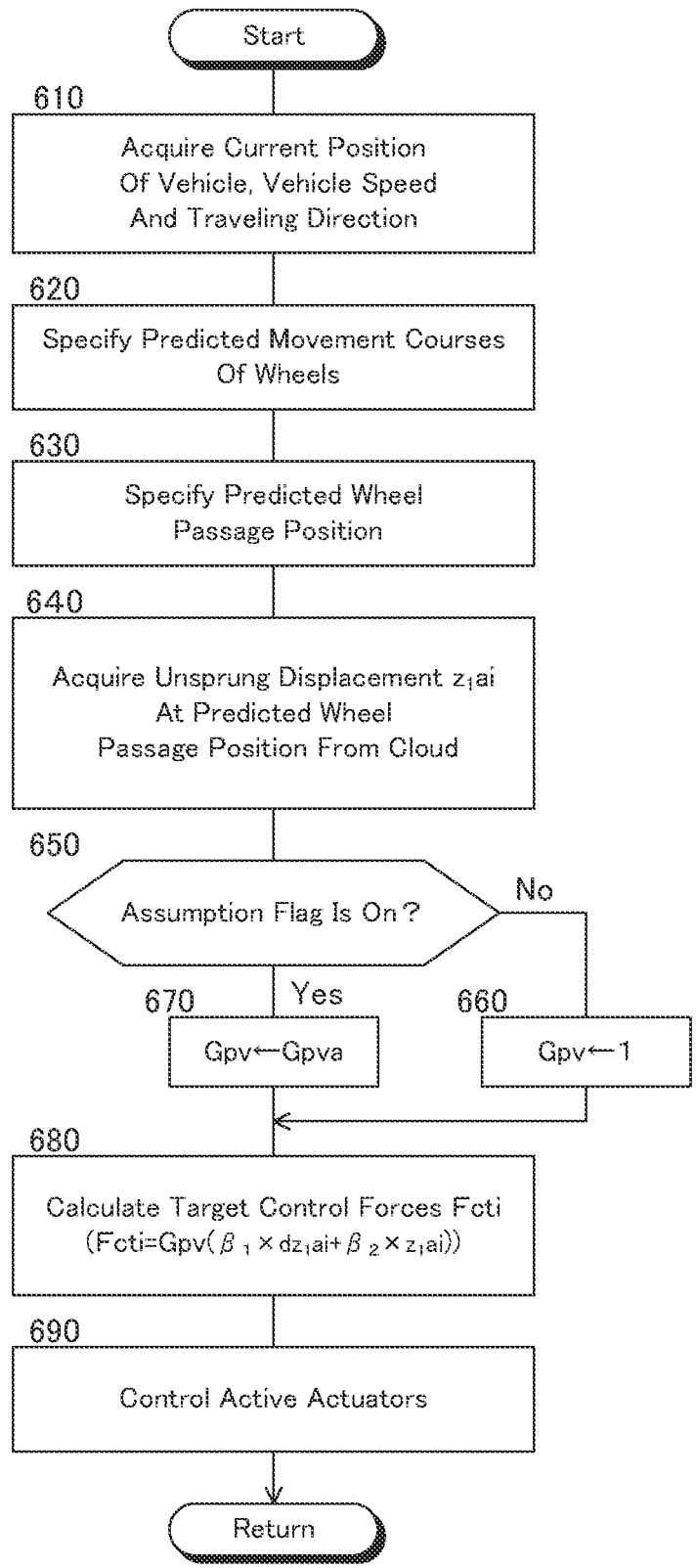
FIG. 6 is a flowchart showing a preview damping control routine of the first embodiment.

In the first embodiment, the preview damping control is executed by executing the damping control routine shown in the flowchart of FIG. 6 at predetermined elapsed time by the CPU of the ECU 30. The preview damping control may be executed for the positions of the left front wheel, the right front wheel, the left rear wheel, and the right rear wheel in this order, for example.

First, in step 610, the CPU acquires history information regarding the position of the vehicle V1 from the position information acquisition device 33, and acquires a current position of each wheel 11, a vehicle speed Vv1, and a traveling direction Td of the vehicle V1 based on the history information.

The ROM of the ECU 30 stores a positional relationship between the mounting position of the GNSS receiver and the position of each wheel 11 in the vehicle V1. The current position of the vehicle V1 acquired from the position information acquisition device 33 is a mounting position of the GNSS receiver, and the CPU determines the position of each wheel 11 based on the current position of the vehicle V1, the traveling direction Td of the vehicle V1, and the positional relationship of each wheel 11. Further, a GNSS signal received by the position information acquisition device 33 includes information on a moving speed of the vehicle V1, and the CPU acquires a vehicle speed Vv1 based on the GNSS signal.

In step 620, the CPU specifies predicted movement paths of the left and right front wheels and the left and right rear wheels based on a current position of each wheel 11, the traveling direction Td of the vehicle V1, and the above positional relationship. The predicted movement paths of the front and rear wheels are paths on which the front wheels 11F and the rear wheels 11R are predicted to move in the future, respectively.

In step 630, the CPU specifies predicted passage positions of the left and right front wheels and predicted passage positions of the left and right rear wheels after a predetermined time based on the predicted movement paths of the left and right front wheels and the left and right rear wheels and the vehicle speed V1.

In step 640, the CPU acquires unsprung displacements $z_1 ai$ (i=fl, fr, rl and rr) of the road surface sections 64 corresponding to the predicted passage positions of the left front wheel, right front wheel, left rear wheel and right rear wheel from the database 45 of the cloud 40.

The unsprung displacements z1*ai* may be acquired sequentially for each control cycle, or the unsprung displacements z1*ai* of the road surface sections 64 corresponding to a series of predicted wheel passage positions may be collectively acquired for each wheel, and may be stored in the RAM of the ECU 30.

In step 650, the CPU determines whether or not the assumption flag 66 of the road surface section 64 corresponding to the predicted wheel passage position is ON. Further, when the CPU makes a negative determination, that is, determines that the unsprung displacement of the road surface section 64 corresponding to the predicted wheel passage position is an unsprung displacement based on a detected value, in step 660, a gain Gpv of the preview damping control is set to 1 that is a standard value. On the other hand, when the CPU makes an affirmative determination, in step 670, the gain Gpv of the preview damping control is set to a positive value Gpva, for example 0.8 which is smaller than the standard value.

When feedback damping control for reducing a vibration of the sprung is performed in addition to the preview damping control, a gain of the feedback damping control may be increased without reducing the gain Gpv of the preview damping control in step 670. Further, in step 670, the gain Gpv of the preview damping control may be reduced and the gain of the feedback damping control may be increased. In other words, in a vehicle in which damping control other than the preview damping control is also performed, the other damping control amount may be increased without reducing the preview damping control amount, or the preview damping control amount may be reduced and the other damping control amount may be increased.

The other damping control is not limited to the feedback damping control. For example, the other damping control may be a control in which road surface displacement-related information of a position in front of the wheel is acquired by a preview sensor such as a laser sensor, and a control force is controlled based on a road surface displacement-related value based on the road surface displacement-related information.

In step 680, the CPU calculates target control forces Fcti (i=fl, fr, rl and rr) of the active actuators 17FL to 17RR of the wheels based on the unsprung displacements $z_1 ai$ and its time derivatives $dz_1 ai$ by the following equation (8) corresponding to the above equation (6).

$$Fcti = Gpv(\beta_1 \cdot dz_1 ai + \beta_2 \cdot z_1 ai) \quad (8)$$

In step 690, the CPU outputs a control command including the target control forces Fcti to the active actuators 17FL to 17RR of the wheels, so that a control force Fc generated by each active actuator is controlled to be the target control force Fcti. Each active actuator outputs a control force corresponding to the target control force Fcti at the timing when each wheel 11 passes through the corresponding predicted wheel passage position.

The vehicle preview damping control method of the present disclosure includes:

step A in which road surface displacement-related information detected by the road surface displacement-related information detection device and position information capable of identifying a position where the road surface displacement-related information was detected are associated with each other and transmitted to the second control unit, step B in which a road surface displacement-related value related to a vertical displacement of the road surface is calculated based on road surface displacement-related information transmitted from the vehicle or other vehicles, step C in which a set of data of the calculated road surface displacement-related value and corresponding position information associated with each other is stored in a storage device as a part of the database, step D in which the preview damping control is performed using the road surface displacement-related value and position information in the database, and step E in which an in-phase component of the road surface displacement-related values at two points corresponding to the left and right wheels is assumed to be the same as a road surface displacement-related value at a point adjacent to one of the two points in a direction crossing a traveling direction of the vehicle in at least one of the step of storing a set of data in the storage device and the step of performing the preview damping control.

In the first embodiment, steps 510 to 530 correspond to step A and step 540 corresponds to step B. Step 550 corresponds to step C and steps 610 to 690 correspond to step D. Further, step 560 corresponds to step E. Therefore, these steps execute the preview damping control method for a vehicle of the present disclosure.

Second Embodiment

<Database Making Routine in the Second Embodiment>

Figure 7:
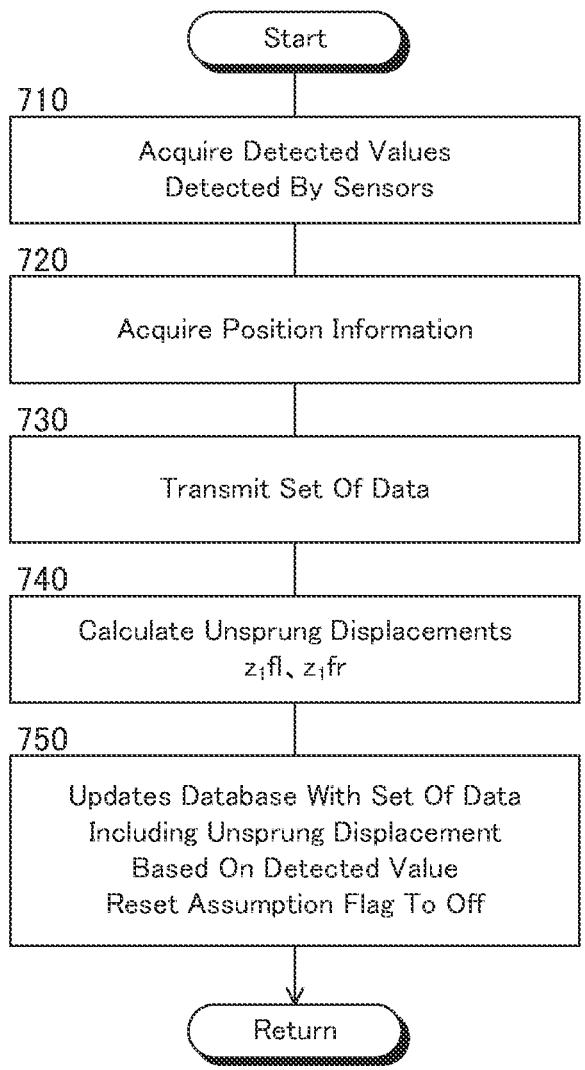
FIG. 7 is a flowchart showing a preview reference database generation routine of the second embodiment.

In the second embodiment, the database making is performed by executing the database making routine shown in the flowchart of FIG. 7 at predetermined elapsed time intervals. Steps 710 to 730 are executed by the CPU of the ECU 30 as in steps 510 to 530, respectively in the first embodiment, and steps 740 to 750 are executed by the CPU of the management server 42 as in steps 530 to 550, respectively in the first embodiment.

Therefore, the description of the database making routine of the second embodiment will be omitted. As can be seen from the comparison between FIGS. 7 and 5, in the second embodiment, the steps corresponding to steps 560 to 580 in the first embodiment are not executed.

<Preview Damping Control Routine in the Second Embodiment>

Figure 8:
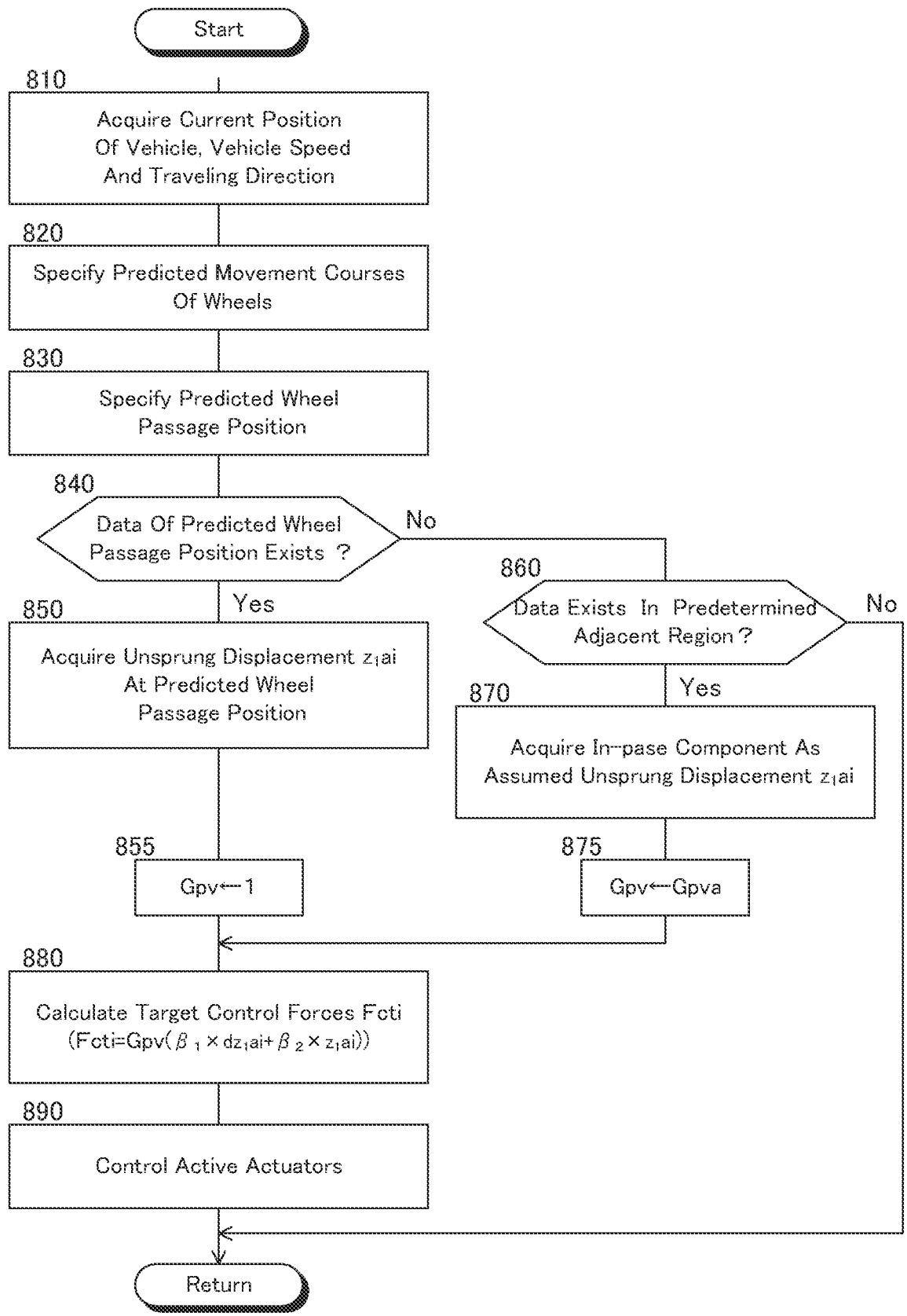
FIG. 8 is a flowchart showing a preview damping control routine of the second embodiment.

In the second embodiment, the preview damping control is executed by executing the damping control routine shown in the flowchart of FIG. 8 by the CPU of the ECU 30 at predetermined elapsed time intervals. The preview damping control in the present embodiment may also be executed for the positions of the left front wheel, the right front wheel, the left rear wheel, and the right rear wheel in this order, for example. Steps 810 to 830 are performed in the same manner as steps 610 to 630, respectively in the first embodiment, and steps 855 and 875 are performed in the same manner as steps 660 and 670, respectively in the first embodiment. Further, steps 880 and 890 are performed in the same manner as steps 680 and 690, respectively in the first embodiment.

When the CPU completes step 830, in step 840, unsprung displacements z1ai (i=fl, fr, rl and rr) of the road surface sections 64 at the predicted wheel passage position and in the region adjacent thereto are acquired from the database 45. Further, the CPU determines whether or not there is data of the unsprung displacement $z_1$ai based on a detected value in the road surface section 64 corresponding to the predicted wheel passage position.

When the CPU makes an affirmative determination, among the unsprung displacement $z_1$i acquired from the database 45 in step 850, the CPU acquires an unsprung displacement $z_1$ai (i=fl, fr, rl and rr) of the road surface section 64 corresponding to the predicted wheel passage position. Further, the CPU sets the gain Gpv of the preview damping control to 1, which is a standard value, in step 855.

On the other hand, when the CPU makes a negative determination, that is, when it determines that there is no unsprung displacement data based on the detected value in the road surface section 64 corresponding to the predicted wheel passage position, the CPU advances the control to step 860. In step 860, the CPU determines whether or not there is an unsprung displacement data based on a detected value in the road surface section 64 in a predetermined adjacent region adjacent to the road surface section 64 that corresponds to the predicted passage position of the wheel (referred to as "wheel to be controlled") corresponding to negative determination in step 840.

Also in the present embodiment, adjacency is the adjacency in a direction perpendicular to a traveling direction of the vehicle V1, but the adjacent direction may be a direction crossing the traveling direction of the vehicle V1, for example, a direction perpendicular to the longitudinal direction of the vehicle V1 or the direction may be perpendicular to the lane. The adjacent range may be different from the adjacent range in the first embodiment.

When the CPU makes a negative determination, in step 860, the CPU temporarily terminates the damping control routine shown in the flowchart of FIG. 8 without executing steps 880 and 890, in other words, without controlling the control force of the preview damping control. Notably, when making a negative determination, the CPU may perform feedback damping control, and may further perform damping control other than preview damping control and feedback damping control.

On the other hand, when the CPU makes an affirmative determination in step 860, it advances control to step 870. In step 870, the CPU determines that an unsprung displacement at the predicted passage position of the wheel to be controlled is the same as an in-phase component of an unsprung displacement of the road surface section in the predetermined adjacent region adjacent to the predicted passage position of the wheel to be controlled and an unsprung displacement at the predicted passage position of the wheel on the laterally opposite side of the wheel to be controlled. In other words, the CPU acquires an in-phase component of the two unsprung displacements as an unsprung displacement $z_1$ai at the predicted passage position of the wheel to be controlled. Further, in step 875, the CPU sets the gain Gpv of the preview damping control to a positive value Gpva smaller than the standard value, for example, 0.8.

Figure 9:
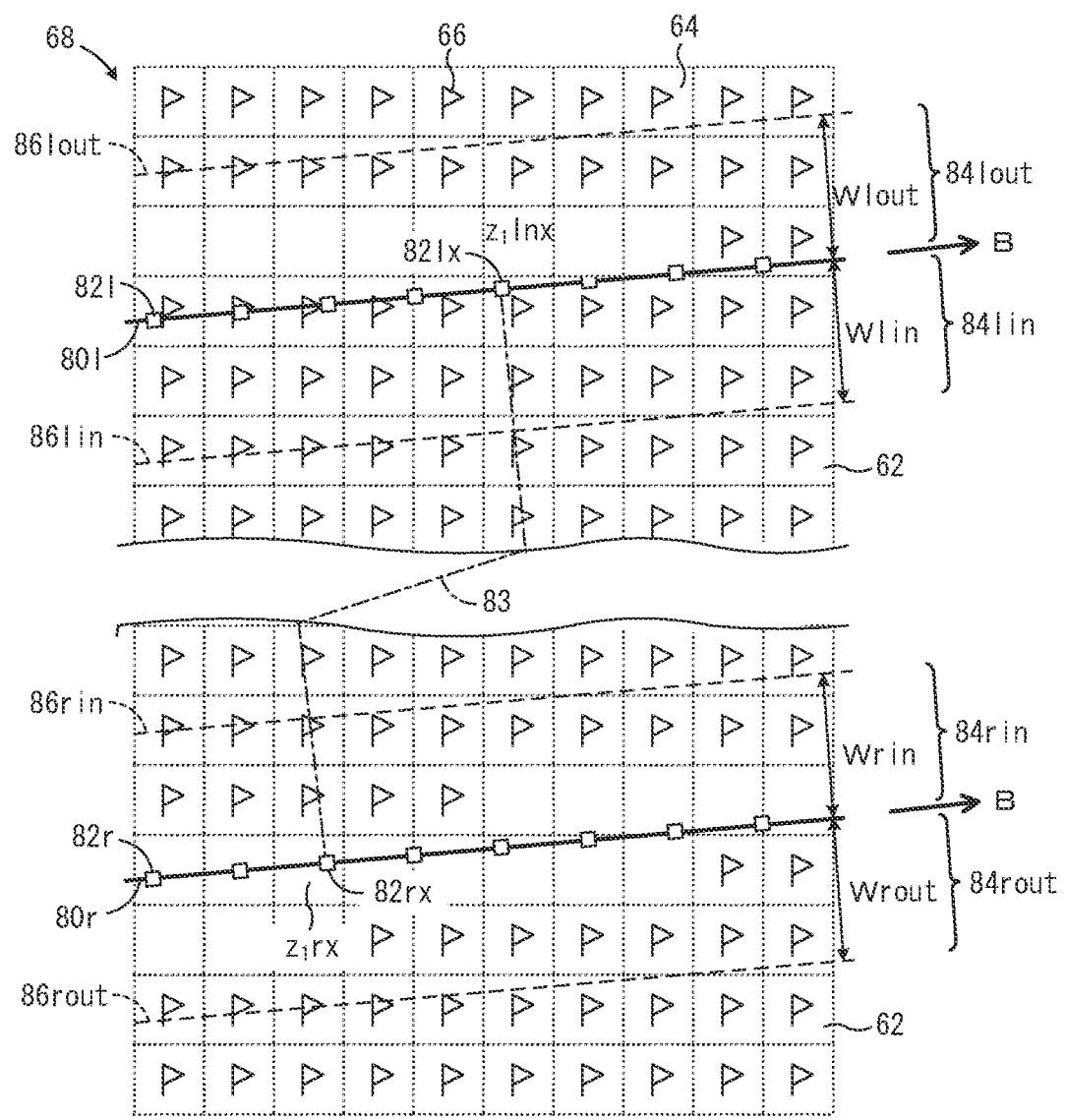
FIG. 9 is a diagram showing a procedure for acquiring an assumed unsprung displacement based on an unsprung displacement calculated based on a detected value in the second embodiment.

FIG. 9 shows an example of how to acquire an assumed unsprung displacement. In FIG. 9, the thick solid lines 80*l* and 80*r* indicate straight lines corresponding to examples of movement paths of centers (not shown) of ground contact regions of tires of the left front wheel 11FL and right front wheel 11FR, respectively. The squares 82*l* and 82*r* on the thick solid lines 80*l* and 80*r* indicate predicted passage positions of the centers of the ground contact regions of the tires of the left front wheel 11FL and right front wheel 11FR, respectively. These movement paths and predicted passage positions are determined based on the predicted movement paths of the wheels and the predicted passage positions of the wheels specified in steps 820 and 830, respectively. Further, in FIG. 9, reference numerals 84*lin*, 84*lout*, 84*rin* and 84*rout* indicate predetermined adjacent regions. The widths Wlin, Wlout, Wrin and Wrout of the predetermined adjacent regions on both sides of the thick solid lines 80*l* and 80*r* may have different values.

The arrow B indicates a moving direction of the left front wheel 11FL and right front wheel 11FR, and for convenience of explanation, it is assumed that the moving direction of the left and right front wheels is the same as a traveling direction of the vehicle V1. It is assumed that in the example shown in FIG. 9, an unsprung displacement $z_1$ based on a detected value is not stored for at least a part of the road surface sections 64 through which the thick solid line 80*l* passes, and the assumption flag 66 is ON, but an unsprung displacement $z_1$ based on a detected value is stored for at least a part of the road surface sections 64 of the predetermined adjacent regions 84, and the assumption flag 66 is OFF. Further, for the road surface sections 64 through which the thick solid line 80*r* passes, the unsprung displacements $z_1$ based on the detected value are stored and the flags 66 are OFF.

In FIG. 9, the alternate long and short dash line 83 connecting the squares 82*lx* and 82*rx* indicates a pair of corresponding squares. 84*lin* and 84*lout* indicate predetermined adjacent regions inside and outside the vehicle with respect to the solid line 80*l*, respectively, and Wlin and Wlout indicate the widths of the predetermined adjacent regions 84*lin* and 84*lout*, respectively. The broken lines 86*lin* and 86*lout* indicate boundaries of the predetermined adjacent regions 84*lin* and 84*lout*, respectively.

Similarly, 84*rin* and 84*rout* indicate predetermined adjacent regions inside and outside the vehicle with respect to the solid line 80*r*, respectively, and Wrin and Wrout indicate the widths of the predetermined adjacent regions 84*rin* and 84*rout*, respectively. The broken lines 86*rin* and 86*rout* indicate boundaries of the predetermined adjacent regions 84*rin* and 84*rout*, respectively.

In the example shown in FIG. 9, the wheel to be controlled is a left wheel. It is assumed that a predicted passage position of the wheel to be controlled is the position of the square 82*lx*, and a predicted passage position of the wheel on the laterally opposite side of the vehicle to be controlled is the position of the square 82*rx*. In addition, it is assumed that an unsprung displacement based on a detected value of the predicted passage position 82*rx* is $z_1 rx$. It is further assumed that an unsprung displacement $z_1 lx$ of the road surface section at the predicted passage position 82*lx* is the same as an in-phase component $((z_1 lnx + z_1 rx)/2)$ of the unsprung displacement $z_1 lnx$ in the predetermined adjacent region adjacent to the road surface section and the unsprung displacement $z_1 rx$. Further, the preview damping control for the road surface section to be controlled is performed based on a target control force calculated based on the assumed unsprung displacement.

On the other hand, when an unsprung displacement $z_1$ based on a detected value is stored for the road surface section of the wheel to be controlled, the unsprung displacement of the road surface section of the wheel to be controlled is not assumed. Further, the preview damping control for the road surface section of the wheel to be controlled is performed based on the target control force calculated based on the stored unsprung displacement.

Notably, when feedback damping control for reducing vibration of a sprung is performed in addition to the preview damping control, a gain of the feedback damping control may be increased without reducing the gain Gpv of the preview damping control in step 875. Further, in step 875, the gain Gpv of the preview damping control may be reduced and the gain of the feedback damping control may be increased. In other words, in a vehicle in which damping control other than the preview damping control is also performed, a control amount of the other damping control may be increased without reducing a preview damping control amount, or the preview damping control amount may be reduced and the other damping control amounts may be increased.

As described above, the preview damping control method for a vehicle of the present disclosure includes steps A to E. In the second embodiment, steps 710 to 730 correspond to step A and step 740 corresponds to step B. Step 750 corresponds to step C, and steps 810 to 855 and steps 880 to 890 correspond to step D. Further, steps 860 to 875 correspond to step E. Therefore, these steps execute the vehicle preview damping control method of the present disclosure.

As can be seen from the above description, according to the first and second embodiments, by pre-reading an unsprung displacement $z_1$ in the preview reference database 45 stored in the storage device 44 by communication and performing preview damping control, vibration of the sprung of the vehicle can be reduced. In particular, not only unsprung displacements at the two points where the road surface displacement-related information is detected is specified, but an unsprung displacement at a point adjacent to one of the two points in a direction crossing a traveling direction of the vehicle is also specified. Therefore, the preview damping control can be performed for the two points where the road surface displacement-related information is detected and the point adjacent to the two points. Thus, even if a large number of vehicles do not travel on the same road at various lateral positions, an effective unsprung displacement $z_1 ai$ can be pre-read to dampen a vibration of the sprung.

In particular, according to the first embodiment, an unsprung displacement in a predetermined adjacent region located in a direction crossing a traveling direction of the vehicle V1 with respect to the two points where the road surface displacement-related information is detected by the pair of road surface displacement-related information detection device can be specified to be the same value as an in-phase component of the unsprung displacements at the two points.

Further, according to the first embodiment, when an unsprung displacement $z_1$ is an assumed unsprung displacement, the assumption flag 66 is set to ON. The assumption flag is an identification mark providing identification information indicating the above fact. Therefore, when the preview damping control is performed using an unsprung displacement $z_1$ in the database 45, it can be determined by the assumption flag 66 whether or not the unsprung displacement is the unsprung displacement calculated based on detected road surface displacement-related information.

Further, according to the first embodiment, when a set of data in which an unsprung displacement $z_1$ calculated based on a road surface displacement-related information detected and position information are associated with each other for a position in the predetermined adjacent region has been stored in the storage device 44, a set of assumed data is not stored in storage device. Therefore, a set of data that is already stored in the storage device with an unsprung displacement calculated based on detected road surface displacement-related information and position information being associated with each other can be prevented from being overwritten by a set of assumed data to be stored.

In particular, according to the second embodiment, when it is determined that an unsprung displacement has not been calculated for the predicted passage position of one of the left and right wheels, preview damping control can be performed using the unsprung displacement assumed to be the same for the predicted passage position of the other one of the wheels.

Further, according to the first and second embodiments, even when an unsprung displacement $z_1$ai at the predicted wheel passage position is an assumed unsprung displacement, a target preview damping control force can be calculated based on the assumed unsprung displacement, and the preview damping control can be performed based on the target preview damping control force.

Further, according to the first and second embodiments, when it is determined that an acquired unsprung displacement at the predicted wheel passage position is an assumed unsprung displacement, by reducing a target preview damping control force Fcti, a control force generated based on the target preview damping control force is reduced. Therefore, as compared to where a target preview damping control force is not reduced even when an unsprung displacement is an assumed unsprung displacement, it is possible to reduce the possibility that an inappropriately large damping control force is generated.

Further, according to the first and second embodiments, even when an unsprung displacement is an assumed unsprung displacement, a vibration of the sprung can be effectively reduced as compared to where no damping control other than the preview damping control is performed. In particular, when the control force generated based on the target preview damping control force is reduced in a situation where a road surface displacement-related value is an assumed road surface displacement-related value, a damping control force is supplemented with a control force of the other damping control, so that the risk of insufficient damping control force can be reduced.

Further, according to the first and second embodiments, the preview reference database 45 including a set of data for each road surface section 64 can be stored in the storage device 44. Therefore, as compared to, for example, where a set of data for each point where a road surface displacement-related information is detected and each point in the adjacent area is stored in the storage device as a part of the database, the number of data sets can be reduced and a storage capacity of the storage device can be reduced.

In particular, according to the first embodiment, the assumption of unsprung displacements for positions in predetermined adjacent regions is made in the database control device 104. Therefore, the preview damping control can be efficiently performed in each vehicle as compared with the second embodiment in which the assumption of unsprung displacements for positions in the predetermined adjacent regions is performed in each vehicle.

On the contrary, according to the second embodiment, the possibility of executing the preview damping control can be increased even in a situation where a set of data is not stored in the storage device 44 over the entire width of a road by the preview control of the first embodiment. In other words, even in a situation where there is no unsprung displacement based on a detected value at a predicted wheel passage position, the possibility of executing the preview damping control based on an assumed unsprung displacement can be increased.

[Modification]

In the first embodiment described above, the assumption flag 66 is used as an identification mark indicating whether or not an unsprung displacement stored in the storage device 44 is an initial value or an assumed unsprung displacement. In the first modification, instead of the assumption flag 66, "the number of times PN that the wheel 11 has passed through each road surface section 64" is used. When the number of times PN is 0, it means that the wheel 11 has not passed, and when the number of times PN is 1 or more, an unsprung displacement $z_1$ based on a detected value has already been stored in the storage device 44 for the road surface section. Therefore, according to the number of times PN, it is not necessary to switch the assumption flag 66 from ON to OFF.

It is to be noted that when the number of times PN is adopted in the first embodiment, in steps 570 and 650, a determination is made whether or not the number of times PN is 0 instead of determining whether or not the assumed flag 66 is ON.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, a road surface displacement-related value based on road surface displacement-related information is a unsprung displacement, but it may be a road surface displacement.

In the above-described embodiments, the latter half of the database making routine is executed by the management server 42 of the database control device 104 provided outside the vehicle. However, at least part of the latter half of the database making routine may be done on the edge side, i.e. on the vehicle. The database 45 does not have to be stored in the storage device 44 of the cloud 40, and may be stored in the storage device 30a.

Further, in the above-described embodiments, vehicle speed Vv1 information is not transmitted from the in-vehicle device 102 to the database control device 104. However, for example, a vehicle speed Vv1 may be acquired based on a current position of the vehicle V1 acquired by the GNSS receiver, and information on the vehicle speed Vv1 may be transmitted from the in-vehicle device 102 to the database control device 104 as a part of the data set. Further, in that case, the vehicle speed Vv1 information may be associated with the unsprung displacement and the position information and stored in the storage device 44 as a part of the database 45.

Further, in the above-described embodiments, a target control force Fcti of the active actuator 17 is calculated based on an unsprung displacement $z_1$ai and its time derivative $dz_1$ai by the above equation (8) corresponding to the above equation (6). However, a target control force Fcti may be simply calculated based on an unsprung displacement $z_1ai$ by the following equation (9) corresponding to the above equation (7).

$$Fcti = Gpv \cdot \beta_2 \cdot z_1 ai \qquad (9)$$

Further, in the above-described embodiments, when the assumption flag 66 is ON, it means that an unsprung displacement stored in the storage device 44 for the corresponding road surface section 64 is an initial value or an assumed unsprung displacement. However, a flag indicating that an unsprung displacement stored in the storage device 44 is an assumed unsprung displacement may be a flag different from the flag indicating that the unsprung displacement is an initial value. When these flags are used, it is possible to identify whether an unsprung displacement stored in the storage device 44 is an assumed unsprung displacement or an initial value.

Further, the first and second embodiments described above may be implemented in combination. For example, the database making routine may be executed according to the routine shown in the flowchart of FIG. 5, and the preview damping control routine may be executed according to the routine shown in the flowchart of FIG. 8.

What is claimed is:

1. A preview damping control apparatus for a vehicle comprising:
    an in-vehicle control device including a pair of road surface displacement-related information detection devices that detect road surface displacement-related information related to a vertical displacement of at least one of positions of left and right wheels and a position in front of the left and right wheels while the vehicle is traveling, and a first control unit that controls the road surface displacement-related information detection devices,
    a preview reference database control device including a storage device that stores a preview reference database and a second control unit that controls the storage device,
    the first control unit is configured to associate the road surface displacement-related information detected by each road surface displacement-related information detection device with a position information capable of identifying a position where the road surface displacement-related information was detected, and send the associated information to the second control unit,
    the second control unit is configured to calculate road surface displacement-related values related to vertical displacements of road surfaces at two points corresponding to the left and right wheels based on detected road surface displacement-related information transmitted from the vehicle or other vehicles, and store sets of data of the road surface displacement-related values and corresponding position information associated with each other in the storage device as a part of the preview reference database, and
    the first control unit is further configured to perform preview damping control for reducing vibration of a sprung of the vehicle by using the road surface displacement-related value and the position information in the preview reference database, wherein
    at least one of the first and second control units is configured to assume that an in-phase component of road surface displacement-related values at two points corresponding to the left and right wheels is the same as a road surface displacement-related value at a point adjacent to one of the two points in a direction crossing a traveling direction of the vehicle.

2. The preview damping control apparatus for a vehicle according to claim 1, wherein the second control unit is configured to assume that a road surface displacement-related value in a predetermined adjacent region located in a direction crossing a traveling direction of the vehicle with respect to the two points where the road surface displacement-related information was detected by the pair of road surface displacement-related information detection devices is the same as an in-phase component of the road surface displacement-related values at the two points.

3. The preview damping control apparatus for a vehicle according to claim 2, wherein the second control unit is configured to store a set of assumed data in which an assumed road surface displacement-related value and position information capable of specifying a position in a predetermined adjacent region are associated with each other for the predetermined adjacent region in the storage device as a part of the preview reference database.

4. The preview damping control apparatus for a vehicle according to claim 3, wherein the second control unit is configured to store the set of assumed data together with identification information indicating that the road surface displacement-related value is the assumed road surface displacement-related value in the storage device as a part of the preview reference database when storing the set of assumed data in the storage device as part of the preview reference database.

5. The preview damping control apparatus for a vehicle according to claim 3, wherein the second control unit is configured not to store the set of assumed data in the storage device when it is determined that a set of data in which a road surface displacement-related value calculated based on a road surface displacement-related information detected when the vehicle or other vehicles traveled and the position information are associated with each other for a position in the predetermined adjacent region has already been stored in the storage device.

6. The preview damping control apparatus for a vehicle according to claim 2, wherein
    the vehicle has a control force generator configured to generate a control force acting between the sprung and an unsprung, and
    the first control unit is configured to determine predicted wheel passage positions where the left and right wheels are predicted to pass through, acquire road surface displacement-related values or assumed road surface displacement-related values at the predicted wheel passage positions in the preview reference database by communication, calculate a target preview damping control force for reducing a vibration of the sprung when each wheel passes through the corresponding predicted wheel passage position based on the acquired road surface displacement-related value or the acquired assumed road surface displacement-related value, and control the control force generator so that a control force generated when the corresponding wheel passes through the corresponding predicted wheel passage position becomes the corresponding target preview damping control force.

7. The preview damping control apparatus for a vehicle according to claim 6, wherein the first control unit is configured to reduce the target preview damping control force when it is determined that a road surface displacement-related value of the predicted wheel passage position acquired by communication is an assumed road surface displacement-related value.

8. The preview damping control apparatus for a vehicle according to claim 6, wherein
the in-vehicle control device is configured to perform other damping control that calculates other target damping control force other than the target preview damping control force, and control the control force generator so that a control force generated by the control force generator when the corresponding wheel passes through the predicted wheel passage position becomes the other target damping control force, and
the first control unit is configured to increase a control force generated based on the other target damping control force when it is determined that the road surface displacement-related value at the predicted wheel passage position acquired by communication is the assumed road surface displacement-related value.

9. The preview damping control apparatus for a vehicle according to claim 1, wherein the first control unit is configured to determine predicted passage positions at which the left and right wheels are expected to pass through, and, when it is determined that no road surface displacement-related value has been calculated for the predicted passage position of one of the left and right wheels, assume that a road surface displacement-related value at the predicted passage position of the one of the wheels is the same as an in-phase component of a road surface displacement-related value calculated for a predetermined adjacent region located in a direction crossing a traveling direction of the vehicle with respect to the predicted passage position of the one of the wheels and a road surface displacement-related value calculated for the predicted passage position of the other of the wheels.

10. The preview damping control apparatus for a vehicle according to claim 9, wherein
the vehicle has a control force generator configured to generate a control force acting between the sprung and an unsprung, and
the first control unit is configured to determine predicted passage positions of the left and right wheels where the left and right wheels are predicted to pass through, acquire road surface displacement-related values at the predicted wheel passage positions in the preview reference database by communication, calculate target preview damping control forces for reducing a vibration of the sprung when the left and right wheels pass through the corresponding predicted wheel passage positions based on the acquired road surface displacement-related values or the assumed road surface displacement-related values, and control the control force generator so that a control force generated when the corresponding wheel passes through the corresponding predicted wheel passage position becomes the corresponding target preview damping control force.

11. The preview damping control apparatus for a vehicle according to claim 1, wherein the second control unit stores road surface section information in which a road surface of each road in the preview reference database is divided into a plurality of road surface sections in advance, and is configured to store position information that can identify a road surface section in the storage device as position information corresponding to a calculated road surface displacement-related value.

12. A preview damping control method for a vehicle for reducing a vibration of a sprung of the vehicle using:
an in-vehicle control device including a pair of road surface displacement-related information detection devices that detects road surface displacement-related information related to a vertical displacement of at least one of positions of left and right wheels and positions in front of the left and right wheels, while the vehicle is traveling, and a first control unit that controls the road surface displacement-related information detection devices, and
a preview reference database control device including a storage device that stores a preview reference database and a second control unit that controls the storage device, wherein
the preview damping control method comprises:
a step of associating road surface displacement-related information detected by the road surface displacement-related information detection devices with position information capable of identifying a position where the road surface displacement-related information was detected and transmitting the associated information to the second control unit,
a step of calculating a road surface displacement-related value related to a vertical displacement of a road surface based on road surface displacement-related information transmitted from the vehicle or other vehicles,
a step of storing a set of data of the calculated road surface displacement-related value and the corresponding position information associated with each other in the storage device as a part of the preview reference database,
a step of performing preview damping control using the road surface displacement-related value and the position information in the preview reference database, and
a step of assuming that an in-phase component of the road surface displacement-related values at two points corresponding to the left and right wheels is the same as a road surface displacement-related value at a point adjacent to one of the two points in a direction crossing a traveling direction of the vehicle in at least one of the step of storing a set of data in the storage device and the step of performing the preview damping control.

* * * * *